3,412,744
MIXED GAS REGULATOR
Wilbur J. Batzloff, San Diego, Calif., assignor to The Regents of the University of California
Filed Sept. 17, 1965, Ser. No. 488,087
3 Claims. (Cl. 137—81)

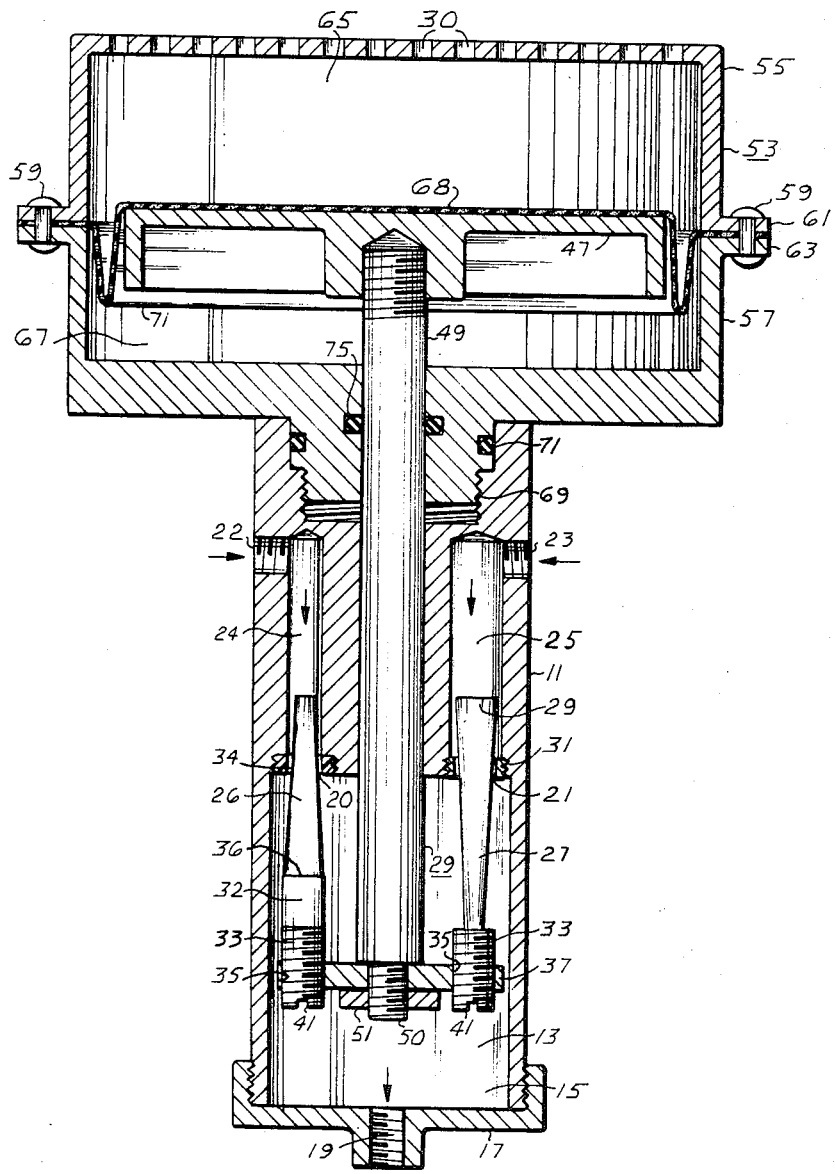

ABSTRACT OF THE DISCLOSURE

A pressure responsive valve, responsive to variation in an ambient fluid, such as variation in water pressures encountered by divers. The valve employs two movable control valves which are responsive to variation in pressure in a closed chamber having a flexible wall which is subjected to the ambient fluid. The control valves vary the ratio of flow of two fluids.

---

The present invention relates to a variable ratio, mixing valve for fluids. Such valve can be employed in a diving apparatus to deliver a predetermined ratio of oxygen and helium to the diver, which ratio varies with variation in the water depth.

The device comprises a housing with two, or more, inlets, an outlet, a mixing chamber, orifices in communication with the inlets and mixing chamber, elongated rods, and mechanism which is adapted to cause relative longitudinal movement between the orifices and the rods.

Further objects and the advantages will be apparent from the following description, reference being had to the accompanying drawing wherein a preferred embodiment of the invention is illustrated.

In the drawing:

FIG. 1 is a sectional view of a mixing valve adapted to mix two gases.

Referring more in detail to the drawing, the housing 11 is of cylindrical shape and includes a cavity to form a mixing chamber 13. The outlet 15 may be threaded externally to accept a fitting 17 which fitting includes a standard diving apparatus thread 19.

The orifices 20 and 21 are preferably circular and are communicated with the inlets 22 and 23 by cylindrically shaped holes 24 and 25, respectviley. Said holes are of sufficient depth to permit full longitudinal travel of the metering rods 26 and 27 within the orifices 20 and 21, respectively. The inlets 22 and 23 are preferably threaded to facilitate their being connected to the gas supplies which supplies are regulated independently, each at a constant pressure.

The metering rods 26 and 27 are tapered and of circular cross sections whereby the cross sections vary throughout the lengths of the rods to effect variation in the annular flow area between the rods 26 and 27 and the orifices 20 and 21 with longitudinal movement of the rods.

A mixing valve for maintaining the proper mixture of oxygen and helium to be introduced to a diver during descent into, and ascent from, the ocean. Oxygen is introduced through the port 23 which port is communicated with the orifice 21, and the elongated metering rod 27 extends through that orifice. Said metering rod varies in cross sectional area throughout its length in such a manner that the annular flow area between the rod and the orifice establishes the proper oxygen flow rate for every position of the rod. The rod 27 is affixed rigidly to the control means 29, the position of which means is directly dependent on the ambient pressure introduced through the sensing holes 30, and consequentially the oxygen flow rate is directly dependent on the ambient pressure, i.e. the depth at which the valve is located. To provide a steadily decreasing ratio of oxygen with increases in pressure, the metering rod 27 is formed with a gradually increasing cross section which moves into engagement with the orifice 21 as the ambient pressure increases. The communication chamber 25 must be of sufficient cross section to permit maximum desired flow around the large end 29 of the rod 27. The orifice 21 must be of somewhat smaller area to permit the flow rate to be throttled when the larger cross section of the rod 27 comes into engagement therewith. This effect is preferably accomplished by inserting a threaded insert 31, with a reduced orifice into the threaded communcation hole 25.

Helium is introduced to the valve through the port 22 and communicated to the orifice 20 by the communication chamber 24. Near the ocean surface, where there is no danger of oxygen poisoning, it is desirable that no helium be introduced to the mixing chamber 13. This is accomplished by including a cylindrical portion 32 in the metering rod 26 which cylindrical portion is adapted to engage the orifice 20 and prevent fluid flow therethrough during such engagement. The seating surface 34 of the orifice 20 is formed of a resilient material to facilitate the sealing action between said orifice and the cylindrical portion 32 of the metering rod. The metering rod 26 is tapered inwardly from the cylindrical portion 32, said taper commencing at a point 36, along the metering rod, determined by the location of said rod with respect to the orifice 20 when it is desirable to commence helium flow. The taper throughout the remainder of the rod is dictated by the size of the orifice 20 and the helium flow rate desired for the various positions of the rod.

The metering rods 26 and 27 include external threads 33 adapted to engage similar internal threads 35 in a mounting plate 37 which plate is attached to the control means 29. The rod also includes slots 41 in the end extending through the mounting plate 37, said slots being adapted to engage the head of a screw driver, thus providing means by which the rods 26 and 27 may be adjusted relative to the control means 29.

The control means 29 preferably includes a piston 47 connected to a shaft 49 on which shaft is mounted the mounting plate 37. The shaft is threaded into the piston 47 and extends through the mounting plate 37, said extending portion 50 being threaded to accept a nut 51.

A unit 53 comprises two housings 55 and 57 fastened together by fasteners 59 extending through the flanges 61 and 63. The piston 47 is disposed in housing 57.

The housing 55 forms a control chamber 65 and the housing 57 forms a captive gas chamber 67. The housings 55 and 57 have a common wall in the form of a dynamic seal which seal is formed by a gas impermeable, flexible member 68 extending over the surface of the piston 47 and between the flanges 61 and 63. The flexible member includes enough excess material 71 to permit it to extend between the circumference of the piston 47 and the walls of the housings 55 and 57. The excess flexible material rolls back onto itself and permits the piston to travel throughout the length of the housing 53.

The housing 55 provides for protecting the flexible wall 68 and includes a series of sensing holes 30 which permit the ambient fluid to enter the control chamber and act upon the control piston 47 through the flexible wall 68. The action of such fluid pressure on the control piston creates a resultant force on said piston urging it downwardly into the housing. This downwardly movement is resisted by the force of the compressible gas entrapped in the captive gas chamber 67. Thus the positions of the piston 47 and rigidly connected metering rods 26 and 27 are dependent on the initial pressure in the captive gas chamber 67, compressibility of such gas and the ambient pressure communicated through the sensing holes 30.

The captive gas in the captive gas chamber 67 is sealed from escaping around the control shaft 49 by an O-ring type gasket 75 included in the captive gas chamber housing 57. The housing 11 and captive gas chamber housing member 57 preferably include interconnecting threads 69 by which they may be fastened together. The captive gas chamber housing 57 also includes an O-ring type gasket 71 to form a seal with the interconnecting housing 11.

From the above description it will be apparent that the longitudinal position of the metering rods 26 and 27 within the orifices 20 and 21 is dependent on the ambient pressure when the sensing holes 30 are exposed to the ambient fluid. Thus the metering rods may be contoured longitudinally to maintain the desired gas flow ratio from the inlet ports 22 and 23 into the mixing chamber 13 and such ratio will be directly dependent on said ambient pressure and will vary automatically with variations in the ambient pressure.

The mixing valve of this invention is also readily adaptable to controlling the flow of additional gases by merely adding additional inlets, orifices and metering rods.

From the foregoing it will be apparent that this invention provides a relatively simple, inexpensive and reliable means for controlling the mixing of two or more fluids.

While the form of embodiment herein shown and described constitutes a preferred form, it is understood that other forms may be adapted falling within the scope of the claims that follow.

I claim:
1. A pressure responsive valve of the type which responds to a variation in pressure of an ambient fluid, for varying the ratio of flow of two fluids, said valve comprising in combination:
 (A) a housing having:
   (1) two inlet orifices;
   (2) a fluid mixing chamber connected with the orifices, said chamber having:
     (a) an outlet,
   said housing forming:
   (3) a bearing;
 (B) a first longitudinally tapered valve extending into one of said orifices;
 (C) a second valve parallel to the first valve, longitudinally tapered in the opposite direction and extending into the other orifice;
 (D) a reciprocating rod in said bearing parallel to the tapered valves and affixed thereto for reciprocating said tapered valves into and out of said orifices;
 (E) a second housing forming a sealed chamber containing a fluid under predetermined pressure, said second mentioned housing including:
   (1) a flexible wall exposed to the ambient fluid and defining one wall of said sealed chamber, said rod being responsive to movement of the flexible wall;
 (F) a third housing including said flexible wall forming a chamber for protecting the flexible wall, said last mentioned housing having an opening for the ingress of the ambient fluid.

2. A pressure responsive valve as defined in claim 1, characterized in that the second and third mentioned housing are in the form of a unit.

3. A pressure responsive valve as defined in claim 2, characterized in that the unit is fixed to the first mentioned housing.

References Cited

UNITED STATES PATENTS

| | | | |
|---|---|---|---|
| 1,793,608 | 2/1931 | Gramberg | 137—607 |
| 2,301,439 | 11/1942 | Moen | 137—607 X |
| 3,047,001 | 7/1962 | Hosford | 137—81 |
| 3,074,434 | 1/1963 | Hughes et al. | 137—607 X |
| 3,308,817 | 3/1967 | Seeler | 128—147 |

FOREIGN PATENTS

| | | |
|---|---|---|
| 61,945 | 12/1954 | France. |
| 797,004 | 2/1936 | France. |

WILLIAM F. O'DEA, *Primary Examiner.*

D. H. LAMBERT, *Assistant Examiner.*